Figure 1:
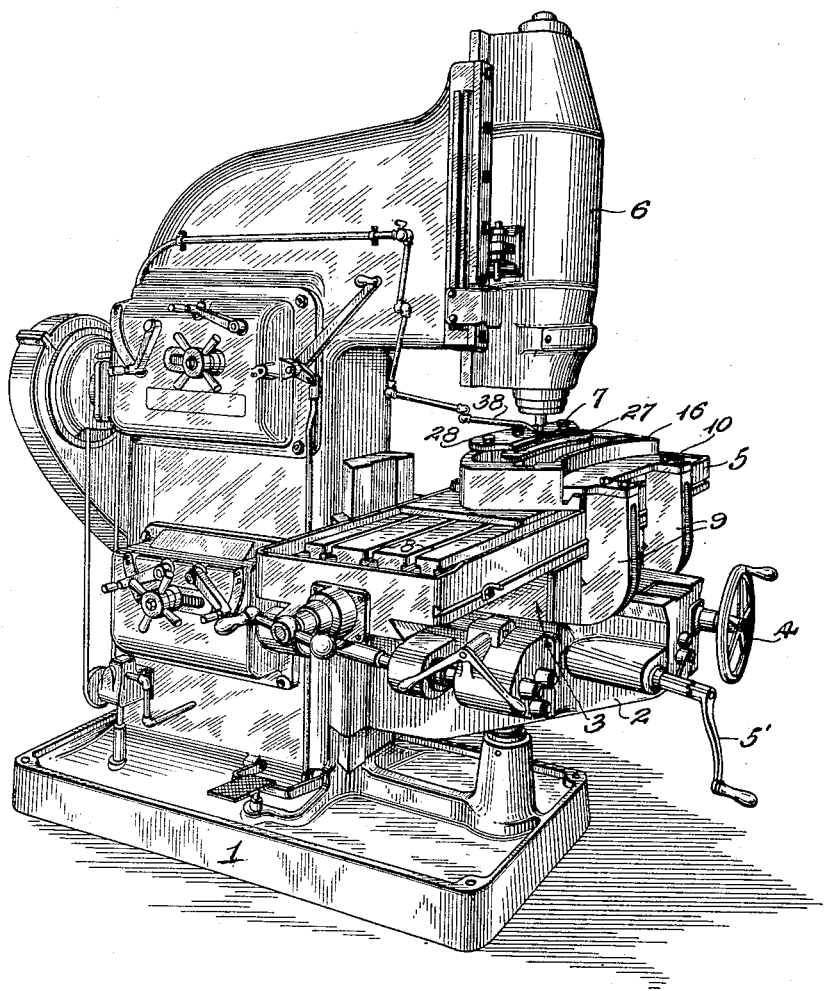

March 21, 1933.  V. L. EMERSON  1,901,952
VARIABLE RADIUS ATTACHMENT FOR MILLING, PLANING,
GRINDING, OR SCRAPING MACHINES
Filed July 16, 1931  4 Sheets-Sheet 1

INVENTOR.
Victor Lee Emerson.
BY
Linton, Kellogg & Smith
ATTORNEYS

March 21, 1933.     V. L. EMERSON     1,901,952
VARIABLE RADIUS ATTACHMENT FOR MILLING, PLANING,
GRINDING, OR SCRAPING MACHINES
Filed July 16, 1931     4 Sheets-Sheet 2

Inventor
Victor Lee Emerson.

By Linton, Kellogg & Smith
Attorneys

March 21, 1933. V. L. EMERSON 1,901,952
VARIABLE RADIUS ATTACHMENT FOR MILLING, PLANING,
GRINDING, OR SCRAPING MACHINES
Filed July 16, 1931 4 Sheets-Sheet 3

Inventor
Victor Lee Emerson.

By Linton, Kellogg & Smith
Attorneys

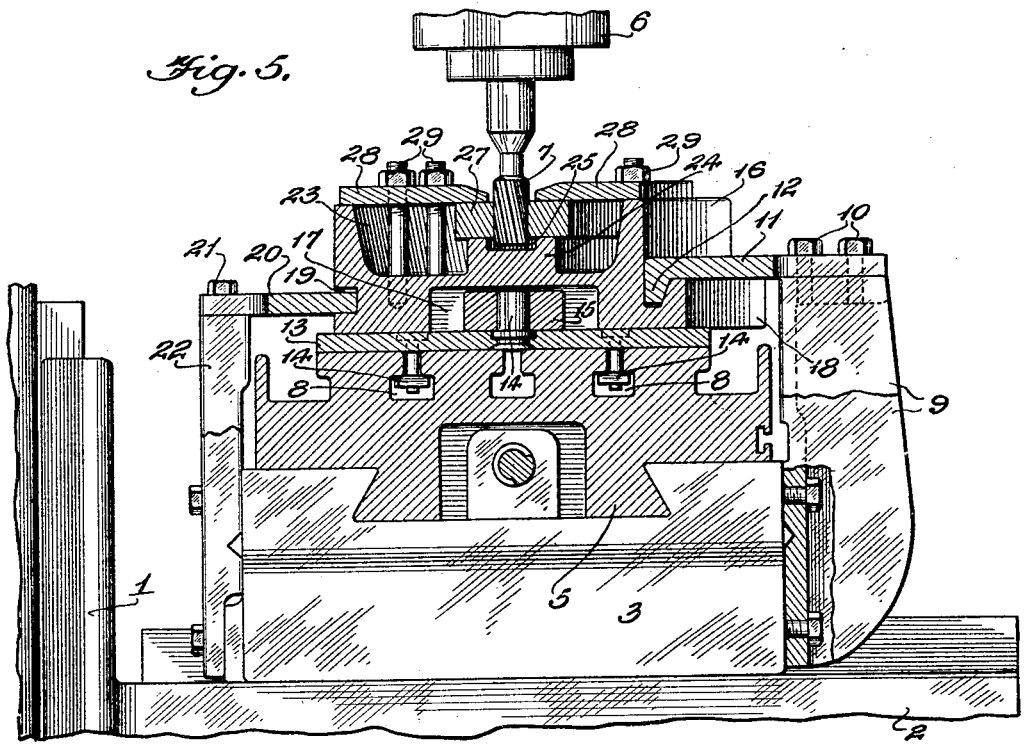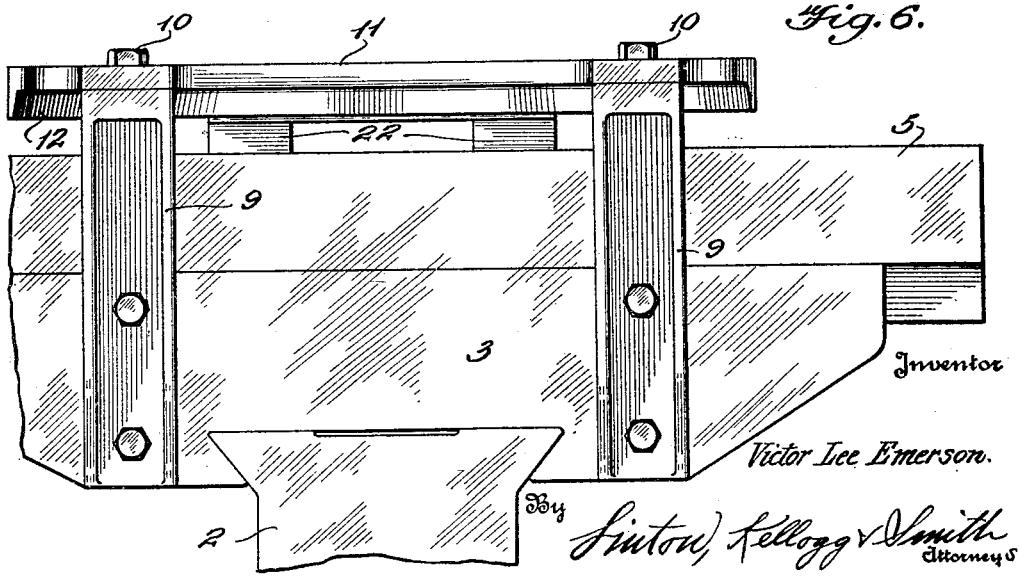

Patented Mar. 21, 1933

1,901,952

UNITED STATES PATENT OFFICE

VICTOR LEE EMERSON, OF PHILADELPHIA, PENNSYLVANIA

VARIABLE RADIUS ATTACHMENT FOR MILLING, PLANING, GRINDING, OR SCRAPING MACHINES

Application filed July 16, 1931. Serial No. 551,251.

The present invention relates to work holding attachments or chucks to be used in conjunction with milling, planing, scraping, or grinding machines wherein the rectilinear movement usually given to the tables or platens of such machines will, through the attachment, convey to the work held thereby a curvilinear movement in order that arcuate and segmental surfaces of a predetermined radius may be produced, having among its principal desiderata, the provision of a practically constructed device of this character composed of few, simple and strong parts, which may be easily and readily attached to any of the standard makes of machines without any alterations thereto and when attached, will not interfere with the efficient operation of the machine nor protrude in the way of the machine's attendant.

The device embodying the present invention is operative as a fixed radius attachment wherein the machine tool has no lateral motion with the longitudinal travel of the machine's table, or as a variable or adjustable radius attachment wherein the machine tool has a transverse movement to that of the table, as a planer; or the machine tool has a vertical movement, as a milling machine; and therefore, it is a further object of the invention to provide a fixed or variable attachment for effecting economical radius milling, planing, scraping, or grinding of articles having a radius such as gun quadrants, locomotive links, and the like, in a high productive manner.

The usual "pivot types" of radius attachments for such machines are only capable of use in a practical way wherein arcuate surfaces are to be formed, scraped, or ground upon small or light work, due to the relatively long and overhanging weighted arms or levers employed, which latter overbalance the bed or platen of the machine, thereby interfering with the efficient working of the cutting tool and, it is a further object of the invention to provide a radius attachment which may be employed for rigidly supporting either small or heavy subjects in order that the latter will be carried into proper engagement with the cutters of such machine throughout that part of the subject to be machined in an arcuate manner and at the same time, practically eliminate all vibration and hammering effects of the cutters which are experienced in the "pivot type" of radius attachments.

A still further object is to provide work holding means for such radius attachments which not only retain the work in proper place while machining the latter, but which form a closure about the work that is oil tight, so as to prevent the oil and cutting or grinding compounds employed from reaching the working parts of the machine or the attachment, and yet permit the proper circulation of oil through the attachment in order that it may flow to a suitable vessel where it is filtered and returned to the cutters.

The invention further contemplates the provision of a relatively long and heavy tapered hold-down for the movable work holding member of the attachment in order that any lost motion or play occurring between such hold-down and the movable work holding member, which is likely to interfere with the thrust of the tool or cutter, will be reduced to a minimum in order that more accurate work may be accomplished in a highly productive manner.

Other important objects and advantages of the invention will be in part obvious and in part pointed out hereinafter.

In order that the invention and its mode of operation may be readily understood by persons skilled in the art, I have in the accompanying illustrative drawings and in the detailed following description based thereon, set out several possible embodiments of the same.

Figure 2:
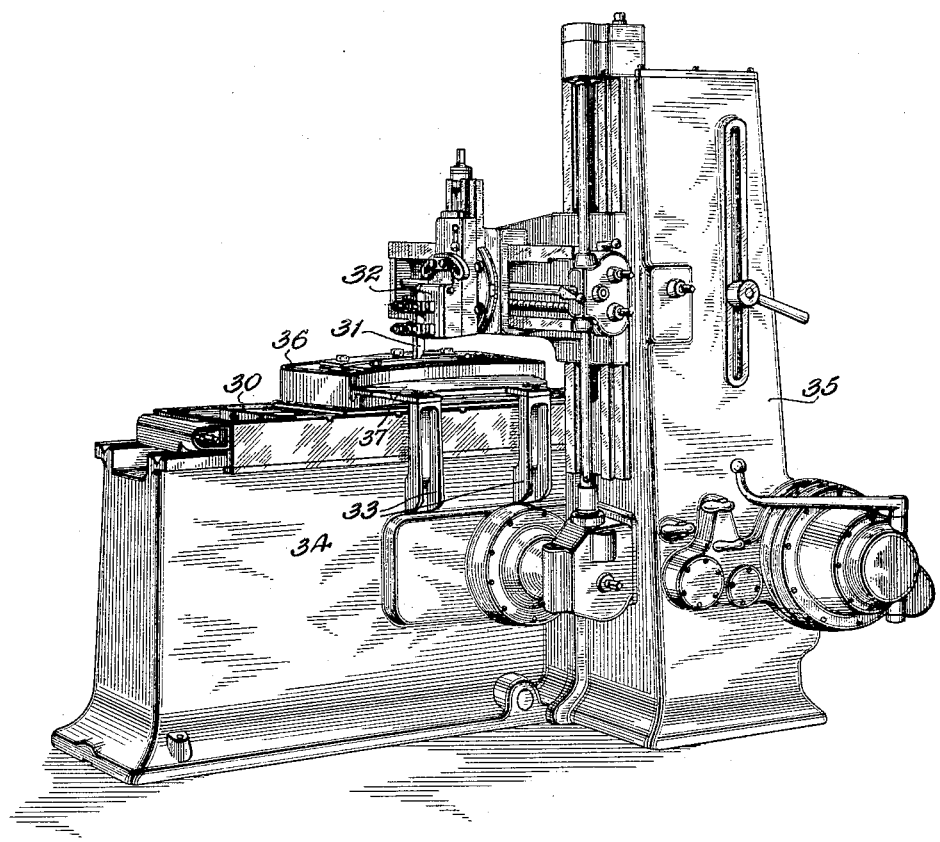
Figure 3:
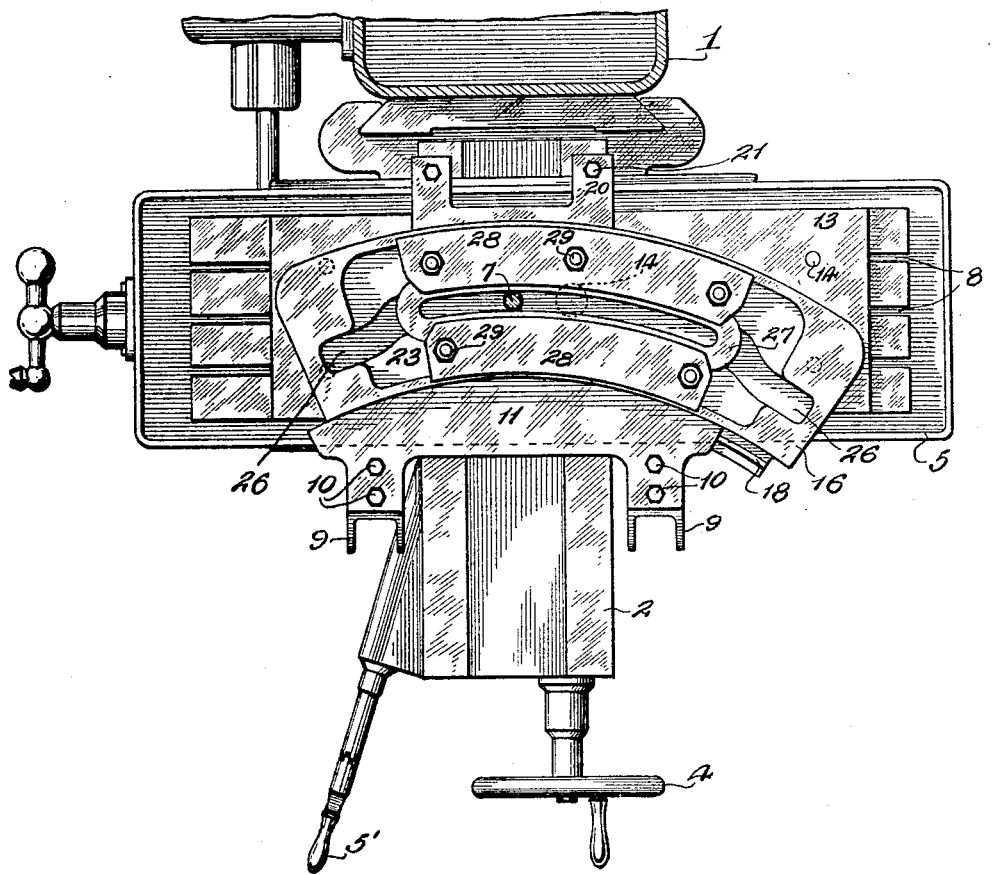
Figure 4:
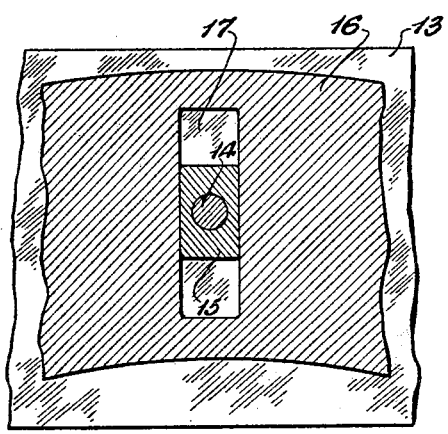

In these drawings:

Figure 1 is a perspective view of a standard make of milling machine having a bed plate or platen capable of longitudinal, vertical and lateral movement, together with a tool head capable of vertical movement and to which machine my improved radius attachment is shown as applied, Figure 2 is a perspective view of a standard make of open side planer having my radius attachment mounted thereupon, Figure 3 is a plan view of the attachment as applied to a bed plate or platen of the milling machine as is shown in Figure 1, Figure 4 is a detail sectional view of the driving block employed between the platen of a milling machine and the radius attachment, Figure 5 is a vertical transverse section through the platen of a milling machine and the radius attachment as applied thereto, and Figure 6 is a detail side elevation of the radius controlling wedge attached to the apron of the milling machine.

Referring now more particularly to the accompanying drawings wherein like corresponding parts are designated by similar reference character throughout the several views, I have shown in Figure 1, a milling machine of a standard make, comprising a suitable support or frame 1 having projecting therefrom a bracket arm 2 upon which is adjustably arranged a saddle 3. This saddle 3 is capable of lateral adjustment through the hand wheel 4 and vertical adjustment through the crank handle 5' upon the supporting arm 2. Capable of rectilinear movement in opposite directions upon the saddle 3. is a platen or work supporting table 5. The milling machine's frame 1 also supports a vertical movable housing 6 in which is journaled a driven shaft carrying with its lower end a rotary cutting tool 7. The bed plate of the work table is provided with the usual T-shaped slots 8 which are adapted for receiving the usual fastening clamps (not shown), whereupon the subject to be milled may be locked upon this work table or platen and through the usual rectilinear movement transmitted to the work table, the latter causes the subject or work to be brought into contact with the cutting tool 7, all of which is well known to those familiar with this type of milling machine.

When it is desired to produce a finished surface upon a segmental or arcuate piece of work, it becomes necessary to apply to the table or platen 5 a radius milling attachment in order that the rectilinear movement given to the table may transmit to the subject to be worked, a curvilinear movement as it comes in contact with the cutting tool 7. Heretofore, the "pivot type" of radius milling attachment has been employed, which generally consists of relatively long and overhanging weighted arms or levers, in order to give the work the proper curvilinear movement. These arms generally extend quite a distance from the work table and are not only in the way of the milling machine's attendant, but due to their overhanging weights and operative connections with the work table cause the latter to become overbalanced and consequently, interfere with the efficient milling of the cutting tool.

The radius milling attachment embodying the present invention comprises a pair of spaced bracket arms 9 each having their lower ends secured in a permanent manner to the saddle 3, so that upon vertical and transverse movement of this saddle upon the supporting arm 2, these bracket arms 9 will be carried therewith. Connected to the upper ends of the bracket arms 9 by means of the bolts 10, is a wedge hold-down or radius control 11 which consists of a plate having formed with one edge thereof, a depending flange 12, which latter has a curvature corresponding with the radius desired to be milled or cut upon the work. This flange 12 is of wedge-shape in cross section, as is better illustrated in Figure 5 of the drawings.

The movable work supporting body portion or block 16 of the attachment is preferably cast from one piece of metal and is adapted to slide upon a plate 13. This plate 13 is retained in fixed position upon the bed plate of the table 5 by means of the bolts 14 which engage in the T-shaped slots 8 of the table, whereupon with the rectilinear movement of the table, this plate 13 will be carried thereby. Secured to and projecting from this plate 13 is a pin 14 over which is positioned a drive block 15. The work holding block 16 of the attachment is provided with an elongated slot 17 which receives the drive block 15 in order that with longitudinal movement in opposite directions, of the table 5 and the plate 13 carried thereby, a reciprocating motion will be transmitted to the work holding block 16 of the attachment, but at the same time, permitting this block 16 to have free lateral movement due to the sliding connection effected between the block 16 and the plate 13 through the block and slot connections 15 and 17, respectively. The work holding block 16 is also provided with a laterally extending flange 18 in which is formed a tapered groove adapted to receive the depending tapered flange 12 of the hold-down or radius control plate 11. The opposite side of the block 16 is provided with a groove 19 in which the inner free end of a guide plate 20 is adapted to slide. This guide plate 20 is secured by means of the bolts 21 to bracket arms 22 also carried by the saddle 3 of the milling machine, whereby through this guide plate 20 and the hold-down plate 11, the block 16 of the attachment will be retained upon the plate 13 and the table 5 in order that with rectilinear movement of the table, the work holding block 16 will be caused to move in an arcuate manner upon the table or bed plate 5 of the milling machine. This movable work retaining block 16 is of segmental configuration, as is better illustrated in Figure 3 of the drawings, having therein a pocket 23 which opens towards the upper face thereof. Formed with the block and arranged throughout the medial portion of the recess or pocket 23 is a segmental work supporting ledge 24, having a groove 25 extending throughout its length. Also formed within this block 16 and arranged at the opposite end of the ledge 24 are the oil receiving reservoirs 26. The work to be milled as herein indicated by the numeral 27 is adapted to be seated upon the ledge 24 and held in position thereupon by means of the locking plates 28. These locking plates are retained in position by means of the stud bolts 29 in the manner as is better illustrated in Figures 3 and 5 of the drawings. One of these plates 28 is removed from the attachment in Figure 1, but illustrated in Figures 3, 4 and 5.

From the foregoing, it is obvious that no part of the attachment which is supported by the table 5 of the milling machine projects from the latter in such a manner as to overbalance the table, or in any manner interfere with its reciprocatory movement. The entire weight of the block 16, together with the work supported thereby is upon the table 5 of the milling machine and the connection between this block 16 and the table 5 is such as to cause the block with the work carried thereby, to travel with the table 5 when the latter is set in motion. The radius hold-down plate 11 not only retains the block 16 upon the table but also forms a guide therefor which causes the block 16 when reciprocated, to oscillate according to the curvature or radius of the hold-down plate. By forming a wedged connection between the block 16 and the hold-down plate 11, it is apparent that all lost motion between the block and the hold-down plate will be automatically taken up. Whereas I have herein shown a plate 13 upon the table 5 of the milling machine as forming the connection between the table 5 and the block 16 of the radius attachment, this plate 13 is solely for the purpose of preventing any wear taking place upon the upper face of the table 5 and should it be desired to eliminate this plate 13, the pin 14 which carries the guide block 15 may be attached directly within one of the T-slots 8 of the table 5.

This attachment is also capable of use upon other machines, such as planers, scrapers or grinders, and in Figure 2 of the drawings, I have illustrated the attachment when used in connection with an open side planer. This open side planer is of a standard make, comprising a frame having the usual reciprocating table or platen 30 and a tool 31 which is carried by the supporting head 32, the latter being capable of vertical and lateral adjustment by the driving mechanism of the planer. The supporting brackets 33 of the attachment are herein shown as permanently secured to the bed 34 of the planer, but it may, of course be attached to the opposite side of the bed as herein shown, or attached to the vertical supporting frame 35 of the planer or in any manner that would be convenient to the operator of the machine. The work holding block 36 of the attachment is connected to the table 30 of the planer in the manner as set forth in the milling machine, and this block 36 is retained in position by means of the radius hold-down plate 37 corresponding to the plate 11 as shown in the attachment applied to milling machines. When the planer is set in motion, the block 36 together with the work supported thereby, will, due to the block's connection with the radius hold-down plate 37, be given an oscillatory movement in order to bring the work into engagement with the cutter 31, whereby the work will be machined according to the curvature or radius of this hold-down plate.

The radius attachment as shown applied to the milling machine is capable of variable adjustment with respect to the cutting tool by turning the hand wheel 4 whereupon the radius of curvature may be increased or decreased and the tool 7 of this milling machine is capable of vertical adjustment in order that it may contact with that portion of the work to be milled. The ledge 24 which supports the work is provided with the groove 25 in order that the lower end of the milling tool 27 may extend through the work and yet not cut this work supporting ledge 24. As the oil is supplied, in the usual manner, to the work through the nozzle 38, it will be permitted to freely circulate over the work and especially that part being milled, and after circulating within the recess 23 of the work supporting block 16, it may be filtered and again used. The pockets 26 provide means for collecting the shavings or chips of metal removed from the work by the cutting tool in order to prevent the free circulation of oil within the work holding block.

This radius attachment as is shown applied to the planer is retained in a fixed position upon the framework of the planer, but the work holding block 16 thereof may oscillate with the reciprocating table 30. As the tool 37 of the planer is capable of vertical and lateral adjustment it may be brought in proper engagement with the work carried by the radius attachment. From the foregoing, it is apparent that this radius attachment may be used as a fixed or variable work holding member, according to the requirements of the machine to which it is applied. It is also obvious that by the use of this attachment upon a milling, planing, scraping or grinding machine, either small or heavy work may be machined in an economical and highly productive manner.

Manifestly, the construction herein shown is capable of considerable modification and such modifications as come within the scope of my claims, I consider within the spirit of my invention.

I claim:

1. The combination with a milling machine comprising a frame and a reciprocatory table mounted thereupon, of a radius milling attachment comprising a work holding member fixedly connected to said table, a wedge hold-down and radius plate engaging said work holding member, and means for fixedly connecting said work hold-down and radius plate to the frame of the milling machine.

2. The combination with a radius milling machine comprising a frame and a reciprocatory table mounted thereupon, of a radius milling attachment comprising a plate fixedly secured to said table, a work holding member loosely connected and slidably mounted upon said plate, a radius guide member engaging said work holding member, and means for fixedly connecting said radius guide member to the frame of the milling machine.

3. The combination with a metal working machine comprising a support, a reciprocatory table carried by said support, an adjustable tool carried by said support, of a radius attachment comprising a work holding block supported by and connected to said table, a radius hold-down and control plate operatively connected to said work holding block, and means for fixedly connecting said radius hold-down and control plate to the frame of the metal working machine.

4. The combination with a milling machine comprising a support, a saddle adjustably arranged upon said support, a reciprocatory table carried by said saddle, a cutting tool arranged above said saddle and carried by said support, of a radius attachment comprising a plate detachably connected to said table, a work holding block slidably mounted and connected to said plate whereby said block will be carried with the table, bracket arms fixedly connected to said saddle, and a radius control plate carried by said bracket arms and engageable with said block.

5. The combination with a radius milling machine comprising a support, a reciprocatory table mounted upon said support, a work holding block solely supported by and fixedly connected to said table, a guide plate carried by said saddle and engageable with one side of said block, a grooved flange projecting from the opposite side of said block, brackets fixedly secured to said saddle, a radius guide plate connected to said brackets, and a tapered flange formed with said radius guide plate for engagement with said grooved flange of the block substantially as and for the purpose specified.

In witness whereof I have hereunto set my hand.

VICTOR LEE EMERSON.